US012699260B2

(12) United States Patent
Seebacher et al.

(10) Patent No.: US 12,699,260 B2
(45) Date of Patent: Aug. 4, 2026

(54) SPINNING DISK MICROSCOPE DEVICE WITH POTENTIALLY ENHANCED IMAGE RESOLUTION

(71) Applicant: Till I.D. GmbH, Planegg (DE)

(72) Inventors: Christian Seebacher, Gräfelf (DE);
Rainer Uhl, Munich (DE)

(73) Assignee: Till I.D. GmbH, Planegg (DE)

( * ) Notice: Subject to any disclaimer, the term of this patent is extended or adjusted under 35 U.S.C. 154(b) by 234 days.

(21) Appl. No.: 18/132,307

(22) Filed: Apr. 7, 2023

(65) Prior Publication Data

US 2023/0324664 A1 Oct. 12, 2023

(30) Foreign Application Priority Data

Apr. 7, 2022 (DE) ..................... 10 2022 108 448.5

(51) Int. Cl.
| | |
|---|---|
| *G02B 21/08* | (2006.01) |
| *G01N 21/64* | (2006.01) |
| *G02B 21/16* | (2006.01) |
| *G02B 27/14* | (2006.01) |

(52) U.S. Cl.
CPC ......... *G02B 21/08* (2013.01); *G01N 21/6458* (2013.01); *G02B 21/16* (2013.01); *G02B 27/141* (2013.01); *G01N 2021/6463* (2013.01)

(58) Field of Classification Search
None
See application file for complete search history.

(56) References Cited

U.S. PATENT DOCUMENTS

| | | | | | |
|---|---|---|---|---|---|
| 5,428,475 | A | * | 6/1995 | Tanaami | G02B 21/0044 |
| | | | | | 359/368 |
| 5,717,519 | A | * | 2/1998 | Sugiyama | G02B 21/0032 |
| | | | | | 359/368 |
| 6,300,618 | B1 | * | 10/2001 | Tanaami | G02B 21/22 |
| | | | | | 250/201.3 |
| 7,256,222 | B2 | * | 8/2007 | Ishizuka | C09D 11/101 |
| | | | | | 522/74 |

(Continued)

FOREIGN PATENT DOCUMENTS

| | | |
|---|---|---|
| CA | 2978123 A1 | 3/2019 |
| DE | 102007009551 B3 | 8/2008 |

(Continued)

OTHER PUBLICATIONS

Extended European Search Report issued in European Application No. 23165590.3, dated Sep. 8, 2023.

(Continued)

*Primary Examiner* — Uzma Alam
*Assistant Examiner* — Djura Malevic
(74) *Attorney, Agent, or Firm* — Harness. Dickey & Pierce. P.L.C.

(57) ABSTRACT

Disclosed herein is a device for enabling observation of a fluorescent sample with a microscope, the device including a disk-shaped body rotatable around a central axis of the disk-shaped body, including microoptical elements or microlenses for spot-generation, and, optionally, microoptical elements or microlenses for condensing emission-spots and enabling super resolution imaging of the sample. The device may further include additional pinholes for spatial filtering of the emission light, but not affecting the excitation light.

6 Claims, 9 Drawing Sheets

(56) References Cited

U.S. PATENT DOCUMENTS

| | | | | |
|---|---|---|---|---|
| 7,280,680 | B2 * | 10/2007 | Yokota | G06T 7/70 |
| | | | | 382/128 |
| 7,521,693 | B2 * | 4/2009 | Ward | H01J 37/20 |
| | | | | 250/424 |
| 7,580,171 | B2 * | 8/2009 | Uhl | G02B 21/0032 |
| | | | | 359/236 |
| 7,706,043 | B2 * | 4/2010 | Uhl | G02B 21/0032 |
| | | | | 359/368 |
| 9,360,665 | B2 * | 6/2016 | Azuma | G02B 26/105 |
| 9,671,600 | B2 * | 6/2017 | Bathe | G02B 27/58 |
| 9,733,462 | B2 * | 8/2017 | Yamazaki | G02B 21/0032 |
| 9,958,661 | B2 * | 5/2018 | Stange | G02B 21/361 |
| 9,989,746 | B2 * | 6/2018 | Bathe | G02B 21/0072 |
| 10,191,263 | B2 * | 1/2019 | Hayashi | G02B 21/0032 |
| 10,352,860 | B2 * | 7/2019 | Kanarowski | G02B 21/008 |
| 10,520,713 | B2 | 12/2019 | Uhl | |
| 10,732,113 | B2 * | 8/2020 | Stubbe | G01N 21/6458 |
| 11,086,113 | B2 * | 8/2021 | Shroff | G02B 21/0032 |
| 11,280,989 | B2 * | 3/2022 | Hayashi | G02B 21/0044 |
| 11,543,640 | B2 * | 1/2023 | Chen | G02B 21/0076 |
| 11,620,519 | B2 * | 4/2023 | Lee | G06N 3/08 |
| | | | | 706/23 |
| 11,747,603 | B2 * | 9/2023 | Shaffer | G02B 21/008 |
| | | | | 348/79 |
| 11,774,738 | B2 * | 10/2023 | Dennis | G01J 3/0229 |
| | | | | 356/301 |
| 11,789,250 | B2 * | 10/2023 | Waag | G02B 21/0008 |
| | | | | 250/459.1 |
| 11,841,311 | B2 * | 12/2023 | Lychagov | G01N 15/06 |
| 11,844,571 | B2 * | 12/2023 | Dana | A61B 3/0025 |
| 12,061,329 | B2 * | 8/2024 | Matsui | G02B 21/008 |
| 2003/0215121 | A1 * | 11/2003 | Yokota | G06T 7/0012 |
| | | | | 382/128 |
| 2008/0204766 | A1 * | 8/2008 | Uhl | G02B 21/008 |
| | | | | 356/615 |
| 2008/0218849 | A1 * | 9/2008 | Uhl | G02B 21/0032 |
| | | | | 359/368 |
| 2009/0279159 | A1 * | 11/2009 | Uhl | G02B 21/0032 |
| | | | | 359/235 |
| 2015/0131148 | A1 * | 5/2015 | Redford | G02B 21/0032 |
| | | | | 359/389 |
| 2015/0378141 | A1 * | 12/2015 | Bathe | G02B 21/025 |
| | | | | 359/385 |
| 2017/0038573 | A1 * | 2/2017 | Uhl | G02B 21/0032 |
| 2017/0192216 | A1 * | 7/2017 | Bathe | G02B 27/58 |
| 2017/0276608 | A1 * | 9/2017 | Kanarowski | G02B 21/0032 |
| 2019/0187447 | A1 * | 6/2019 | Hayashi | G02B 21/0076 |
| 2021/0325650 | A1 * | 10/2021 | Chen | G02B 21/0044 |
| 2023/0324664 | A1 * | 10/2023 | Seebacher | G02B 21/008 |
| | | | | 250/458.1 |

FOREIGN PATENT DOCUMENTS

| | | | |
|---|---|---|---|
| DE | 102013001238 | A1 | 7/2014 |
| DE | 102015112960 | B3 | 10/2016 |
| EP | 0753779 | B1 | 9/2003 |
| JP | H09133870 | A | 5/1997 |
| JP | 2004138819 | A | 5/2004 |
| WO | 2015164844 | A1 | 10/2015 |

OTHER PUBLICATIONS

"Super-resolution spinning-disk confocal microscopy using optical photon re-assignment" by Azuma & Kei, Optics Express 23, 15004 (2015).

Examination Report issued in German patent No. 10 2022 108 448.5, dated Sep. 16, 2022.

* cited by examiner $$f_{36}=r2/r1*f_{37} \qquad f_{37}$$

$$f_{36}=r2/r1*f_{37}$$

SPINNING DISK MICROSCOPE DEVICE WITH POTENTIALLY ENHANCED IMAGE RESOLUTION

TECHNICAL FIELD

The present disclosure relates to the field of microscopy. More particularly, the present disclosure relates to devices for imaging fluorescent samples by employing multipoint excitation and the parallel detection of emission spots, which can be concentrated into smaller ones with enhanced numerical aperture.

BACKGROUND

It is on ongoing aim in all fields of microscopy to increase optical resolution and contrast of a micrograph. One of the approaches in the field of fluorescence microscopy employs a spatial filtering pinhole to block out-of-focus light in image formation, resulting in so called confocal microscope. One variant of confocal imaging relies on an array of moving pinholes on a rotating (spinning) Nipkov-disk for spatially filtering excitation an emission beamlets. Since such a series of pinholes scans an area in parallel, each pinhole is allowed to hover over a specific area for a longer amount of time, thereby reducing the excitation energy needed to illuminate a sample when compared to single point laser scanning microscopes. To concentrate the excitation light into the pinhole-array, a second rotating disk, carrying a corresponding array of microlenses, is usually employed.

Patent publication DE 102015112960 B3 (corresponding to patent publication U.S. Ser. No. 10/520,713B2) discloses a spinning disk confocal microscope, which requires a single rotating disk, only. Suitable microoptical elements on the disk create a rotating excitation pattern in front of this disk, which is, using suitable optical elements, subsequently imaged into the sample plane of an objective lens. The corresponding emission pattern is imaged by means of the same objective and spatially filtered using pinholes on the very same disk, whereby excitation and emission beam are separated respectively combined by dichroic filter-elements and the path-lengths of excitation and emission beam is adjusted by means of a suitable path-length difference-compensation so as to make the plane of the excitation pattern to coincide with the focal-plane of the emission pattern in the pinhole-plane.

Scientific publication "Super-resolution spinning-disk confocal microscopy using optical photon re-assignment" by Azuma & Kei, Optics Express 23, 15004 (2015), discloses a super-resolution concept, which is also disclosed in patent publications JPH09133870A, EP0753779B1. These publications employ two disks, a first disk carrying microlenses so as to create a spot-pattern for fluorescence excitation, and a second pinhole-disk in the focal plane of these microlenses, for spatial filtering. This spatial filtering is in effect for both the excitation beam on its way to the microscope, and for the emission beam on its return-path through the pinholes. Separation of excitation and emission beams is achieved by means of a suitable dichroic element (short-pass) between pinhole- and microlens-disk, whereby the emission beam is reflected before it is directed towards the camera. To achieve super-resolution, Azuma & Kei enhance the numerical aperture of the emission spot-cones with the help of an additional set of microlenses on the pinhole-disk. They are positioned such that microlenses and pinholes are separated by an optical distance corresponding to ½ the focal length of the microlenses. However, while this affects the emission beam as desired for super-resolution, it also affects the excitation beam—which has to follow the same beam path through the pinholes as the emission beam—in an unfavourable fashion, because increasing the NA of the emission beam, reduces the NA of the excitation beam, in turn. Thus, to fill the pupil of a high NA objective, the approach of Azuma & Kei requires additional relay-optics between disk and microscope, thus increasing the effective magnification and reducing the field of view of the camera. These limitations are explained in more detail below.

In an example, a pattern of microlenses spaced with a pitch of 500 μm and a camera-field of 15×15 mm is provided. Given the mandatory position of the dichroic element between microlens- and pinhole-disk, the distance between the two disks must exceed the size of the 45° dichroic element, and the latter must be larger than the desired field of view. Since, on the other hand, the distance between the disks must equal the focal-length of the microlenses, this focal-length is restricted to values exceeding the space needed for the dichroic. With a realistic microlens-focal length of 18 mm, the maximal numerical aperture (NA) of the excitation cone thus cannot exceed $0.25/18 = 0.014$. Even without superresolution this NA barely fills the objective pupil of a 100×oil immersion objective, where an $f = 200$ mm tubelens yields a diameter of 5.6 mm, less than the diameter of the pupil of a 100×1.49 objective, which is 5.96 mm. However, in a superresolution version with microlenses on the pinhole-disk to double the NA of the emission spots, this becomes even worse: the NA of the excitation spots is also cut in half! Thus, in order to provide diffraction limited excitation spots, the magnification of the microscope has to be adjusted using suitable relay-optics between the disk and the microscope, and this, in turn, cuts the usable field of view. As a result, Azuma & Kei (2015) merely cover a field of view of 50×60 μm.

SUMMARY

The present disclosure recites one or more solutions to the aforementioned problems and disadvantages of the background art. Other technical advantages of embodiments of the present disclosure will be readily apparent to one skilled in the art from the following description and claims. Accordingly, the present disclosure is directed to devices for enabling observation of a fluorescent sample with a microscope according to the appended independent claims. With more detail, the present disclosure is directed to devices employing a single disk only. The disk provides everything needed for spinning disk imaging with a desired degree of super-resolution, i.e., microoptical elements or microlenses for spot-generation, optionally microoptical elements or microlenses for condensing emission-spots, and—also optionally—additional pinholes for spatial filtering of the emission light, but not affecting the excitation light. In preferred embodiments, the microoptical elements may be in form of convex lenses or in form of concave lenses, preferably microlenses. Any other form of microoptical elements having adequate optical characteristics may be used as well. Further preferred embodiments are disclosed in the corresponding dependent claims.

In an aspect, the present disclosure is directed to an embodiment of a system for enabling observation of a fluorescent sample with a microscope, the device comprising:

a disk-shape body rotatable around a central axis of the disk-shaped body comprising a first plurality of microoptical elements, having a first focal-length ($f_{36}$) and being located at first radial distance ($r_2$) from the centre of the disk-shaped body, and an at least partially light transmitting area being located at a second radial distance ($r_1$) from the centre of the disk-shaped body;

a first tube lens positioned between the disk-shaped body and the objective of the microscope; a second tube lens positioned between the disk-shaped body and the objective of the microscope, wherein the focal length of the first tube lens is $r_2/r_1$ times the focal length of the second tube lens; a dichroic beamsplitter positioned between the disk-shape body and an objective of the microscope; a reflective element positioned between the disk-shape body and an objective of the microscope; wherein:

an preferably collimated excitation beam intersects the disk-shaped body through the first plurality of microoptical elements at the first radial distance ($r_2$), resulting in a rotating excitation spot-pattern in the focal plane of the first plurality of microoptical elements, which is imaged into infinity by a tube lens, thus forming an excitation beam, which, after being reflected by the reflective element and by the dichroic beamsplitter, is transformed into an excitation pattern on the fluorescent sample by the objective of the microscope, where it elicits an emission spot-pattern, which is transformed into an emission beam by the microscope objective, is then transmitted by the dichroic element and is transformed into an emission spot-pattern by a tube lens, whereupon it passes the at least partially light transmitting area on the disk-shaped body.

In embodiments of the present disclosure, the device may further comprise a second plurality of microoptical elements located on the disced shaped body at a second radial distance, $r_1$, from the centre of the disk-shaped body, the microoptical elements exhibiting a second focal length, $f_{41}$, and being located to form a pattern corresponding to the emission spot pattern. The focal-length $f_{41}$ may assume values between infinity, in which case the NA of beamlets and hence the resolution remains unchanged, and a finite value, which leads to a doubling of the NA and provides maximal resolution-enhancement.

In embodiments of the present disclosure, the at least partially light transmitting area may be configured as plurality of confocal pinholes, wherein the pinholes are located such that they provide spatial filtering for the emission spot pattern.

In an aspect, the present disclosure is directed to an alternative embodiment of a device for enabling observation of a fluorescent sample with a microscope, the device comprising:

a disk-shape body rotatable around a central axis of the disk-shaped body comprising a plurality of microoptical elements, having a focal-length (f);

a first and a second dichroic beamsplitter positioned between the disk-shape body and microscope optics;

a first and a second reflective element positioned between the disk-shape body and the microscope optics; and wherein:

a collimated excitation beam intersects the disk-shaped body through the plurality of microoptical elements resulting, in front of the disk, in a rotating excitation spot-pattern in the focal plane of the plurality of microoptical elements, which, after being reflected by a first dichroic element, by a first reflecting element and a second dichroic element, is imaged through the microscope optics into a sample plane, wherein the excitation spot-pattern generates a corresponding emission pattern. The emission beampath, on its way back to the disk-shaped body, is transmitted by the second dichroic beamsplitter, is reflected by the second reflective element and transmitted by the first dichroic beamsplitter. The emission spot-pattern beamlets intersect the disk-shaped body through the plurality of microoptical elements, resulting in a plurality of beamlets, whose focal spots are condensed while their NA is increased accordingly. Here, too, the NA-increase may assume values between 1× and 2×.

In embodiments of the devices according to the present disclosure, the devices may further comprise a plurality of pinholes, each pinhole of the plurality of pinholes corresponding to and matching with the pattern a microoptical element of the plurality of microoptical elements being part of the emission pathway.

In embodiments of the devices according to the present disclosure, the plurality of pinholes may be arranged on an additional layer on the disk-shaped body, the additional layer being selectively transmitting the excitation light wavelengths but reflecting—outside the pinhole-openings—the emission wavelengths, thus constituting a spatial filter for emission light. To this end, the pinholes may be etched into a dichroic layer, which may be located on the disked-shaped body itself, or it may be fixedly attached to the disked-shaped body.

In embodiments of the devices according to the present disclosure, the plurality of pinholes may be arranged on a second disk-shaped body. The second disk-shaped body may be made of a material selectively transmits excitation light and constitutes a spatial filter for emission light. In addition, thereto, the pinholes may be etched into the material being selectively transmission for excitation light and constitutes a spatial filter for emission light. Alternatively, the pinholes may be arranged on a layer being selectively transmission for excitation light and constitutes a spatial filter for emission light, the layer may be positioned on the second disk-shaped body.

In these embodiments of the devices according to the present disclosure, the excitation and emission beam are combined in an infinity optical space of the projection system relaying the emission spot-pattern to the camera. This is achieved by means of a dichroic element or pinhole in a reflecting element, which reflects>99% of the emission light whereas it transmits a laser-spot, which is transformed into the collimated excitation beam illuminating the spot-forming plurality of microlenses.

In embodiments of the devices according to the present disclosure, the emission spot pattern may be imaged onto a detector through a projective lens system, forming the desired image when the first disk-shaped body, and, if present, the second disk-shaped body is rotated. In addition thereto, the device may further comprise a third dichroic element positioned in an infinity space in the projective lens system.

In embodiments of the devices according to the present disclosure, the emission spot pattern may be imaged onto a detector through a projective lens system, forming the desired image when the first disk-shaped body is rotated. In addition thereto, the device may further comprise a third reflective element positioned in an infinity space in the projective lens system. In addition thereto, the third reflective element may further comprise a hole, and the excitation beam may be directed through said hole before it is collimated by the projective lens system. Preferably, the hole may be positioned in the backfocal-plane of the third reflective element.

In embodiments of the devices according to the present disclosure, the projective lens system may comprise a first telecentric lens and a second telecentric lens.

These and further objects, features and advantages of the present disclosure will become apparent from the following description when taken in connection with the accompanying drawings which, for purposes of illustration only, show several embodiments in accordance with the present disclosure.

Figure 1A:
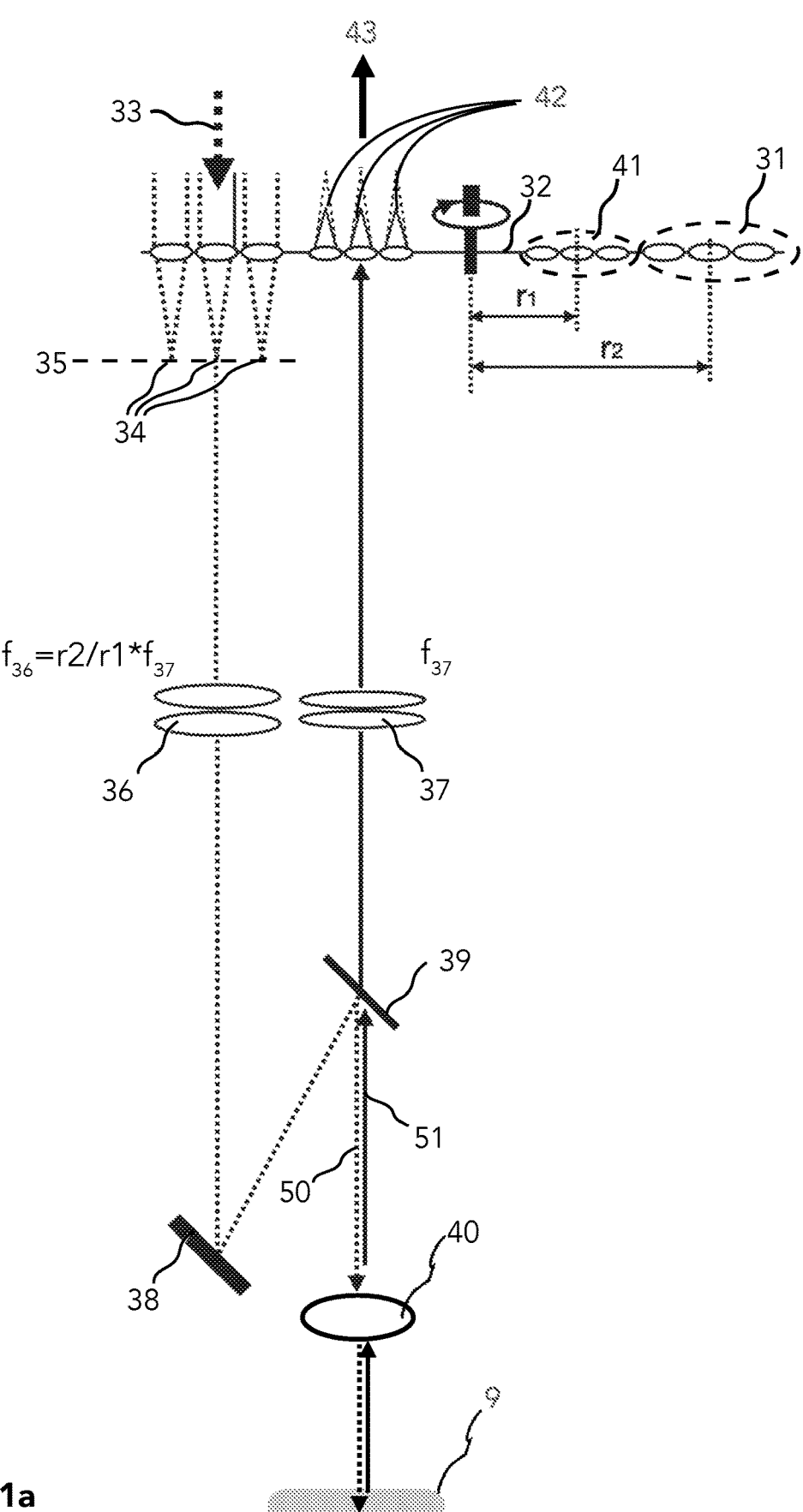
FIG. 1a is a schematic illustration of the beam path in a first embodiment of a device according to the disclosure.

The accompanying drawings illustrate exemplary embodiments of the invention and serve to explain, by way of example, the principles of the invention.

DETAILED DESCRIPTION

The present invention will now be described more fully hereinafter with reference to the accompanying figures, in which preferred embodiments are shown. The method, however, may be embodied in many different forms and should not be construed as limited to the embodiments set forth herein. It should be noted that these figures are intended to illustrate the general characteristics of the methods utilized in certain embodiments. However, the figures may not precisely reflect the precise structure or performance characteristic of any given embodiment. Moreover, in the figures like reference numerals designate corresponding parts throughout the different views or embodiments.

The present disclosure extends the teaching of the prior art so as to achieve a resolution enhancement by using a single disk, only, for creating the rotating excitation pattern and for condensing the resulting emission spots into smaller ones with increased NA, which are subsequently imaged onto a camera-chip so as to form a resolution-enhanced image. This "spot-condensation" is achieved with the help of an array of microoptical elements, preferably a microlens-array, arranged on the disk-shaped body, such as a rotating disk, in a pattern precisely matching the emission spot-pattern and being perfectly aligned with it. The spot-condensing microlens-array is located on the very same rotating disk, which has generated the excitation pattern, and in one embodiment of the disclosure it even employs the same microlenses for excitation-pattern generation and for tighter focussing of the emission spot-pattern. In another embodiment, a set of different microlenses are used for excitation-pattern generation and for tighter focussing of the emission spot-pattern. The microoptical elements may be in form of convex lenses and/or concave lenses.

The degree of focal-spot condensation obeys the Lagrange-Invariant principle, i.e. it increases the numerical aperture (NA) of the individual spot-cones accordingly and can maximally be adjusted to yield a twofold condensation. According to the present disclosure, adjustment of the degree of resolution enhancement is achieved by tuning the path-length difference between the excitation- and emission-beam so as to yield the desired spot-condensation.

Now referring to FIGS. 1a to 1d showing a schematic illustration of a first embodiment of the present disclosure relying on a single disk-shaped body 32 rotatable around a central axis. The disk-shaped body 32 contains a pattern of a first plurality microoptical elements, preferably microlenses 31 with a focal-plane 35. Collimated excitation light 33 passes the first plurality of microoptical elements 31, thereby creating a spot-pattern 34 for excitation in front of the disk in the focal plane 35 of the first plurality of microoptical elements 31. The resulting excitation beam 50 elicits an emission-pattern in the sample 9. The emission beam 51, on its way back to the disk-shaped body 32, is separated from the excitation beam-path 50 by a single dichroic element 39. Between this dichroic element 39 and the disk 32 the two beams 50 respectively 51 propagate on different courses, use tube-lenses 36 respectively 37 of different focal lengths, $f_{36}$ respectively $f_{37}$, whereby the number of reflections each encounters before reaching the disk 32 must be odd for both, even for both, or even. Accordingly, in the schematic the emission beam 51 reaches the disk with no reflections, whereas the excitation beam 50 is reflected by the dichroic element 39 and the reflective element, preferably a mirror 38 on its way to the microscope objective 40. Emission beam 51 and excitation beam 50 intersect the disk at different radii, $r_1$ and $r_2$.

In case the dichroic element is reflecting the excitation wave-length(s), excitation takes the longer "tour", needs a correspondingly longer focal length ($f_{36}>f_{37}$) for its tube-lens 36 and must originate from a microoptical element-pattern that is positioned closer to the outer rim of the disk, at $r_2$, than the radius $r_1$, at which the emission beam reaches the disk. There, i.e. at $r_1$, a matching pattern of a second plurality of microoptical elements, 41, preferably microlenses, scaled $r_2$: $r_1$ with respect to the pattern of first plurality of microoptical elements 31, provides the concentration of the spots into smaller spots as needed for super-resolution. Resolution enhancement is maximal if the focal plane of the tube-lens 37 in the emission beam-path is adjusted such relative to the microoptical elements that these microoptical elements 41 produce a twofold increase in NA. The resulting image at a distance of $0.5*f_{41}$ behind the second plurality of microoptical elements 41 is then projected onto a detector, such as a camera, using a suitable projection assembly. The path-length can be adjusted to yield maximal resolution enhancement, but any NA-enhancement between 1× and 2× can be chosen at will in order to fine-tune the desired resolution enhancement.

The advantage of the embodiment depicted in FIG. 1a is that it merely needs a single dichroic element, and given this element is positioned in the infinity optical space, the dichroic layer can even be applied to a thick glass-substrate in order not to compromise dichroic flatness while at the same time avoiding spherical aberrations. Moreover, aligning the position of two beams 50, 51 relative to each other is more straightforward, but the tube lenses 36, 37 must exhibit equal distortion and a precisely adjustable $r_1/r_2$ ratio.

Figure 1B:
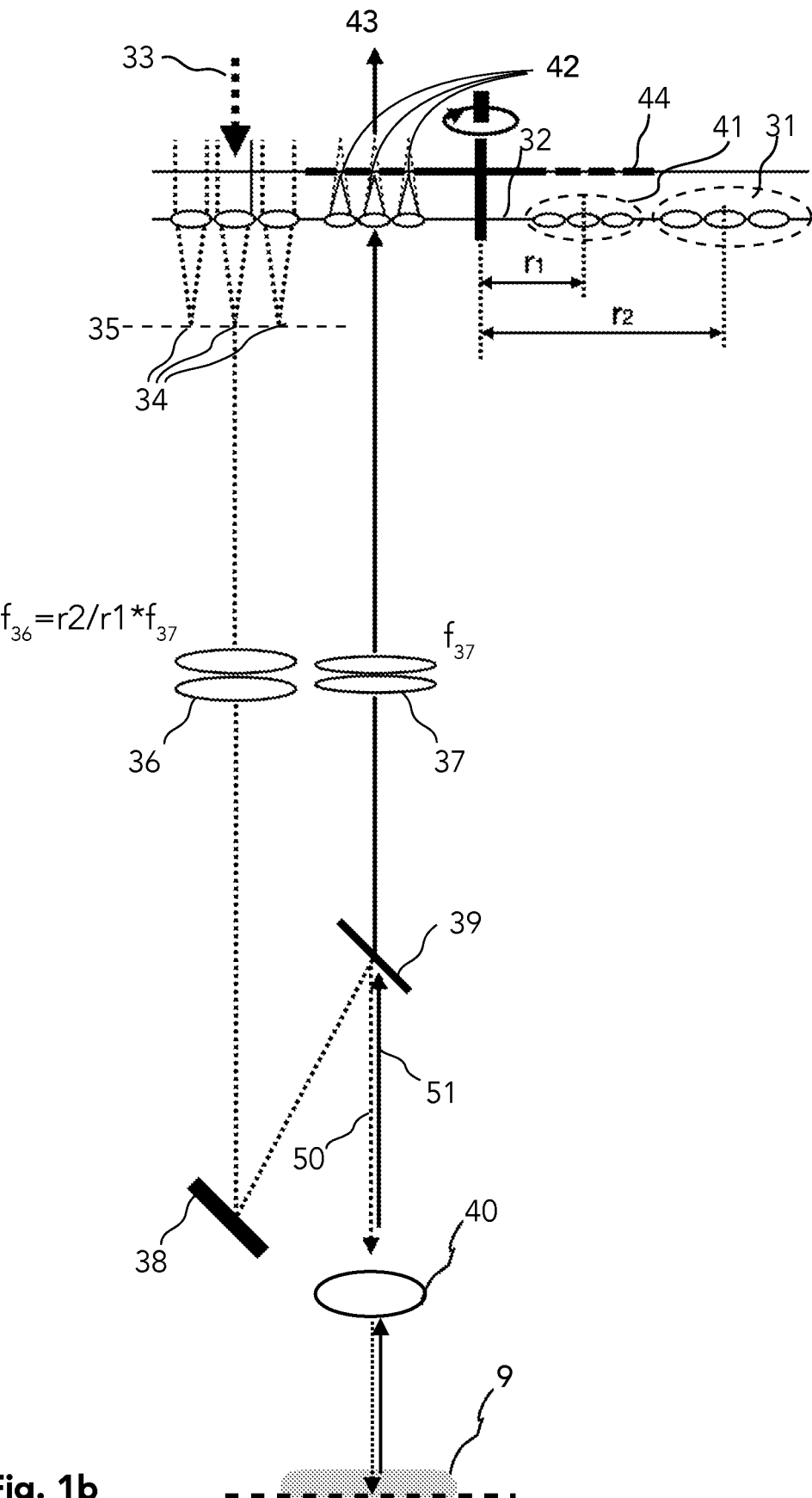
FIG. 1b is a schematic illustration of an extension of the embodiment of FIG. 1a to enable out-of-focus rejection.
Figure 1C:
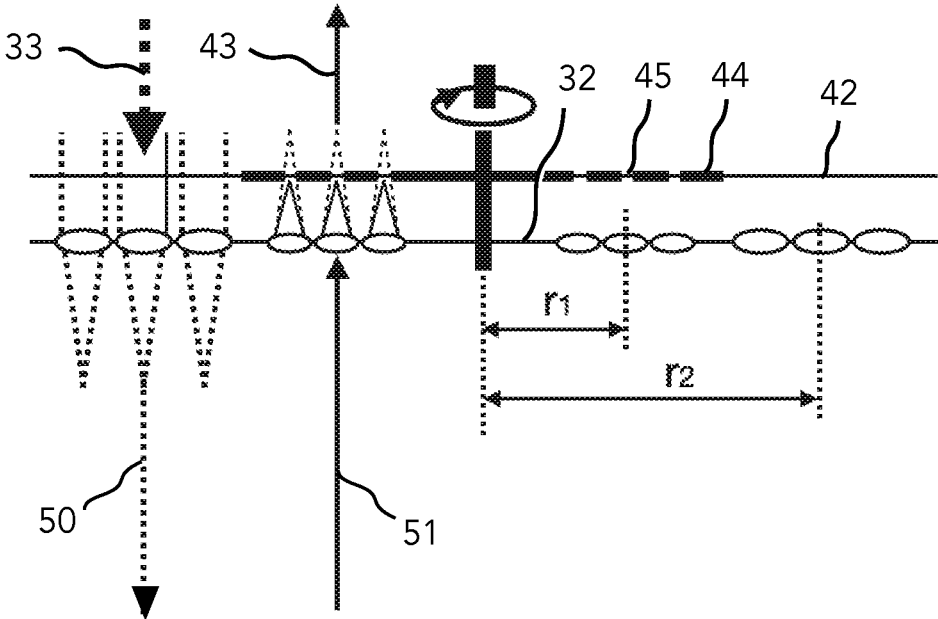
FIG. 1c is an amplified view of the out-of-focus enablement according to FIG. 1b.
Figure 1D:
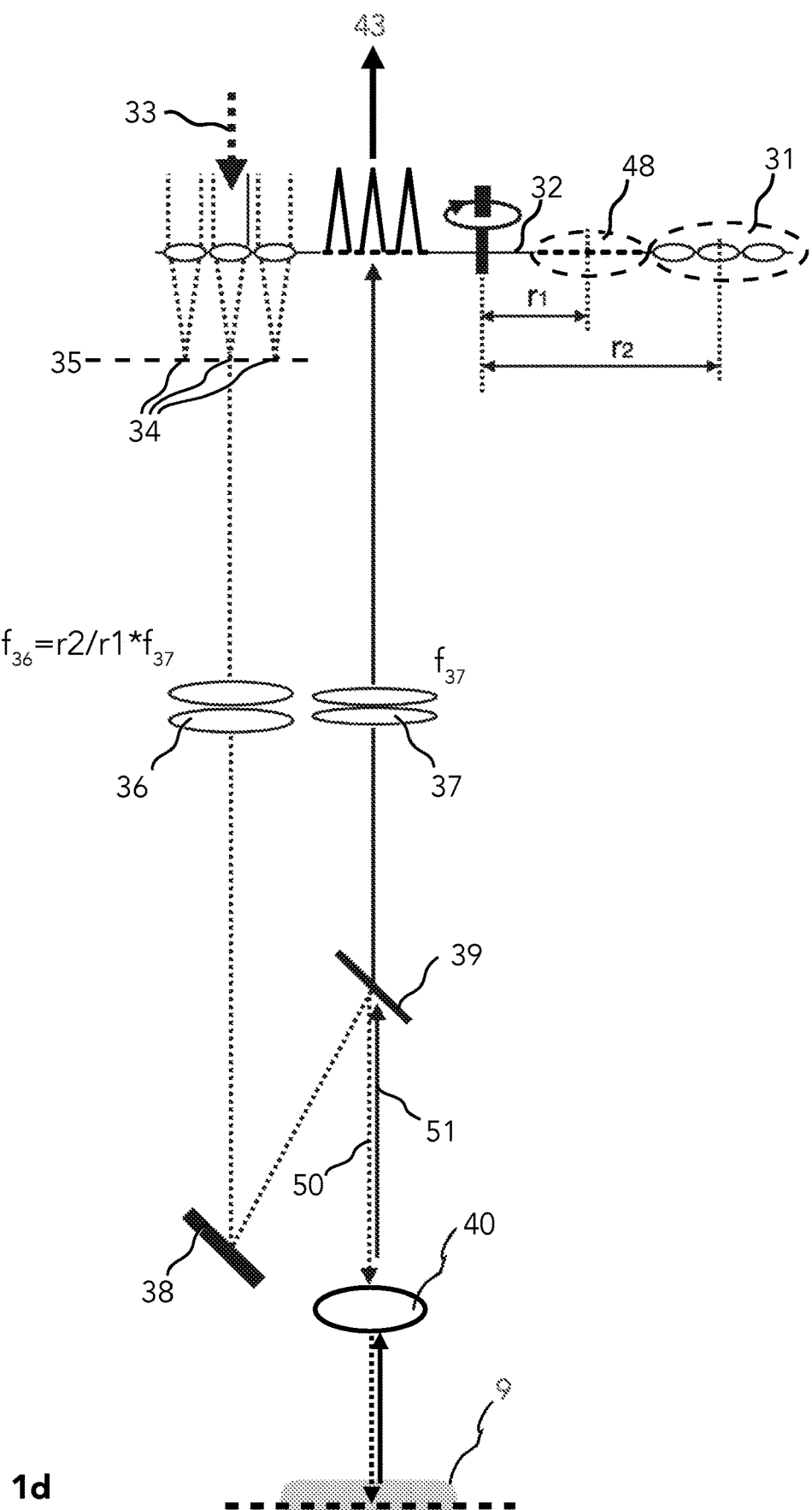
FIG. 1d is another schematic illustration of the beam path in the first embodiment of the device according to the disclosure.

The optical scheme described above affords super-resolution, but no sectioning, yet. As shown in FIG. 1*b*, out-of-focus rejection can be achieved by placing a matching pinhole layer 44, aligned with the second plurality of microoptical elements 41, at a distance required to afford the desired resolution enhancement. With microoptical elements 41 positioned on the front-side of the disk 32 and the pinholes 45 on the rear-side, the focal length of the microoptical elements 41 relative to the glass-thickness is chosen such that the desired resolution enhancement is achieved. For maximal resolution enhancement the focal length of the microoptical elements 41 is chosen such that the NA is increased twofold. A larger focal length, yielding less than a twofold NA-increase, reduces the degree of resolution enhancement. Moreover, omitting microoptical elements 41, as shown in FIG. 1*d*, that is replacing them with flat surfaces at $r_1$ (in effect, by increasing their focal length to infinity), thereby forming an at least partially light transmitting area 48, no resolution enhancement is achieved. Thus the disclosure teaches a spinning disk-system that is perfectly functional for lower magnification objectives with large pupil which are poorly served by systems employing more than one disk for generating the excitation pattern and spatially filtering the emission pattern.

Figure 2A:
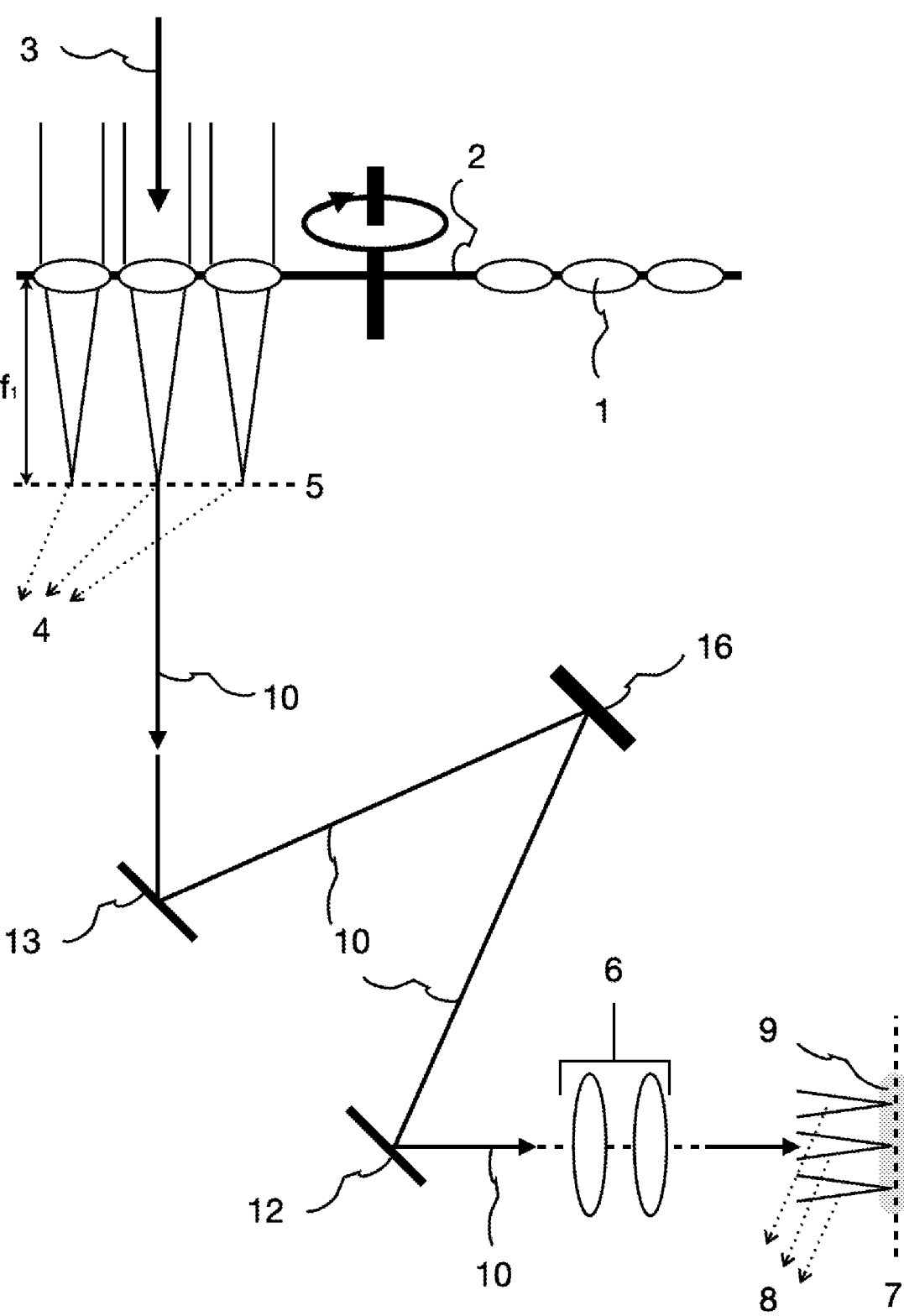
FIG. 2a is a schematic illustration of the excitation beam path in a second embodiment of a device according to the disclosure.
Figure 2B:
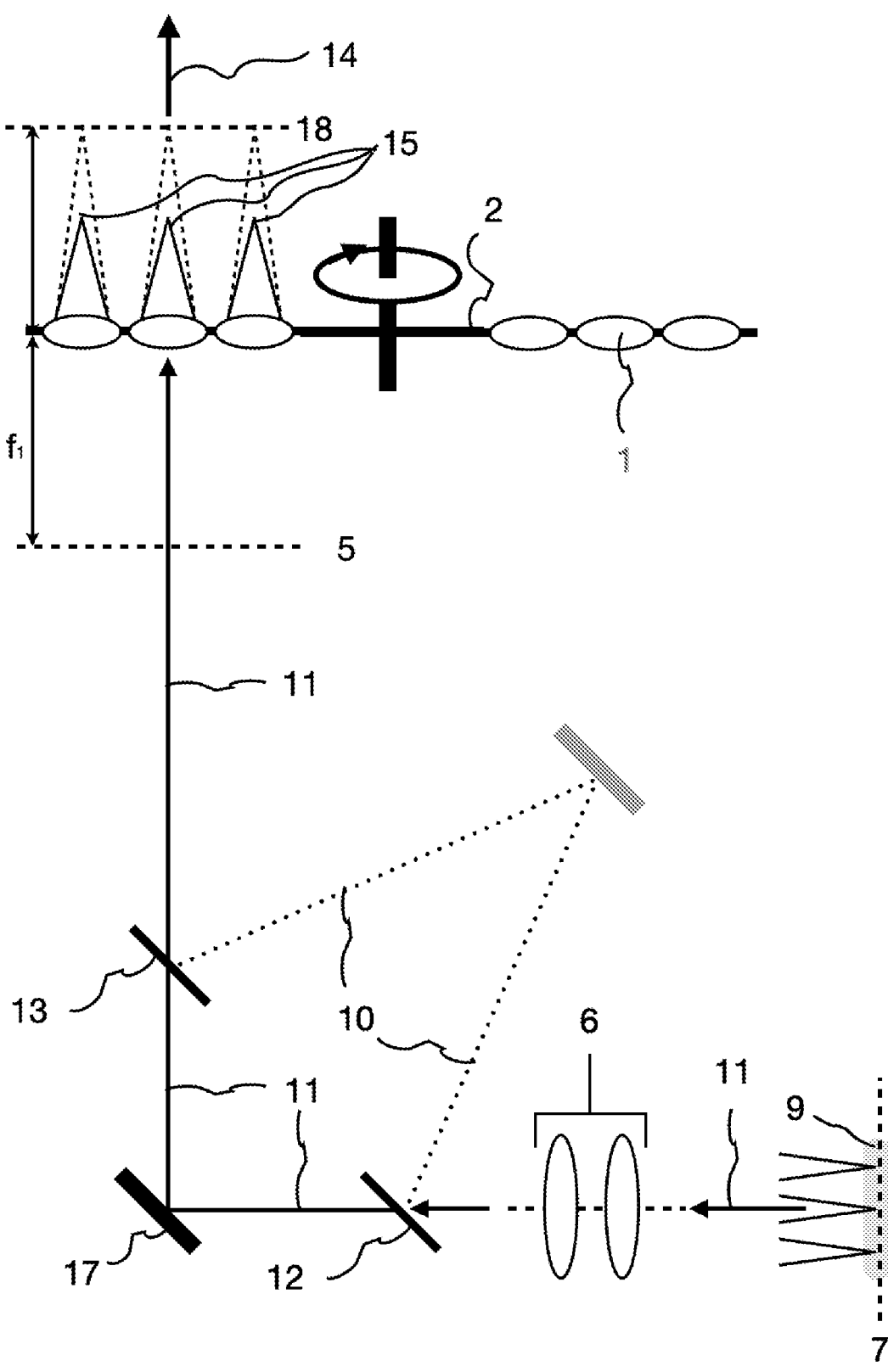
FIG. 2b is a schematic illustration of the emission beam path in the embodiment of a device of FIG. 2b.

FIGS. 2*a* and 2*b* show an alternative embodiment according to the present disclosure, in which a suitable pattern of microoptical elements, such as microlenses 1 with focal-length $f_1$, is applied to a rotating disk-shaped body 2 and is illuminated with collimated excitation light 3 from its rear side (FIG. 1*a*). The resulting excitation spot-pattern 4 in front of the disk, in the focal-plane 5 of the microoptical elements 1, is imaged, using a set of suitable optics elements 6, into a sample-plane 7 of a microscope, where it forms an excitation pattern 8 in a sample 9. The beam between disk and sample is—in the following—called excitation image-beam 10.

On its reverse path (FIG. 2*b*) the emission beam 11 is separated from the excitation beam-path 10 by means of a dichroic beamsplitter 12, and the beam-paths 10, 11 are reunited again by means of a second dichroic beamsplitter 13. The emission beam takes a shortcut on its way back to the disk, thereby creating a path-length difference for the two beam-paths 10, 11, which can be adjusted such that the emission spot-pattern 14 does not fall into the same plane as the excitation spot pattern 5 in front of the disk 2, but significantly behind it. If the path-length difference is made to yield twice the focal length $f_1$ of the microoptical elements 1, the spots of the emission beam 11 pass the microoptical elements 1 backwards so as to form a 2× concentrated spot-pattern 15 at a distance of $0.5 \cdot f_1$ behind the microoptical elements 1 in the disk 2.

Figure 4A:
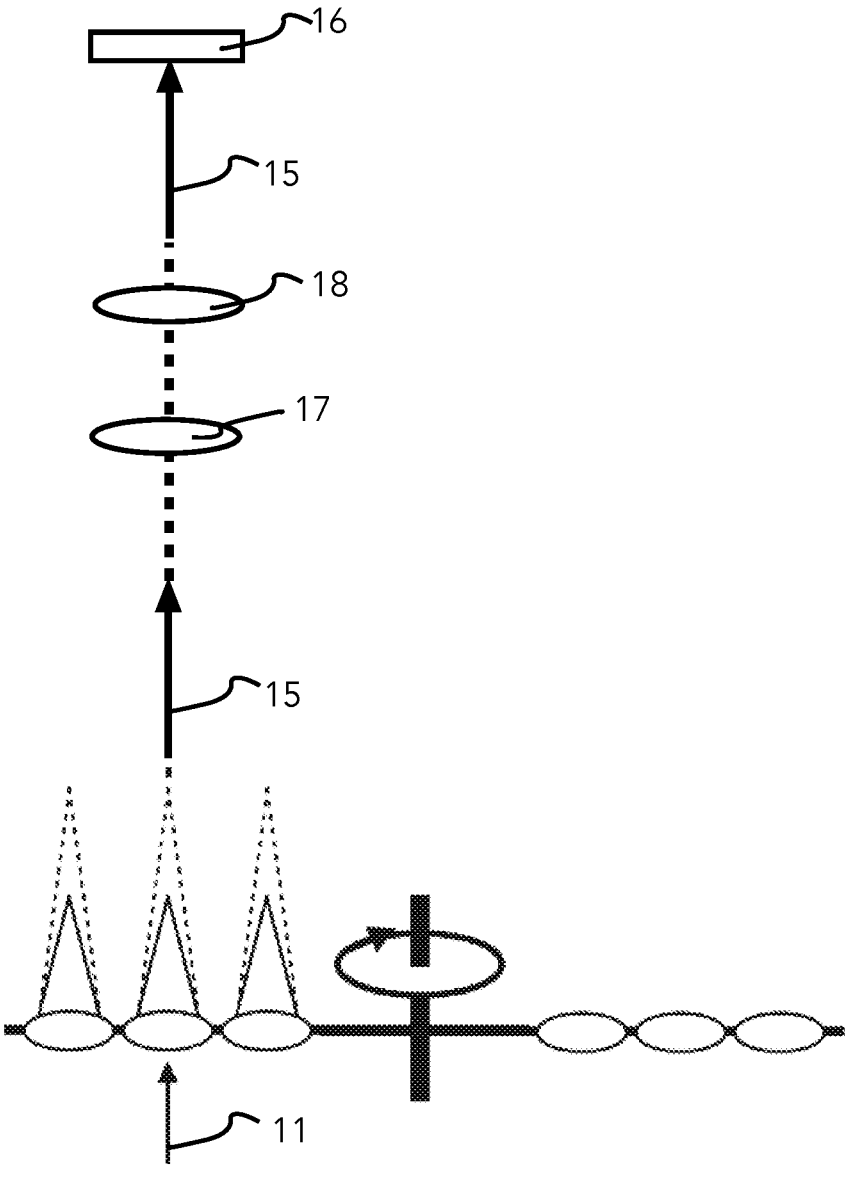
FIG. 4a is a schematic illustration of the emission path from the microoptical elements to the detector.
Figure 4B:
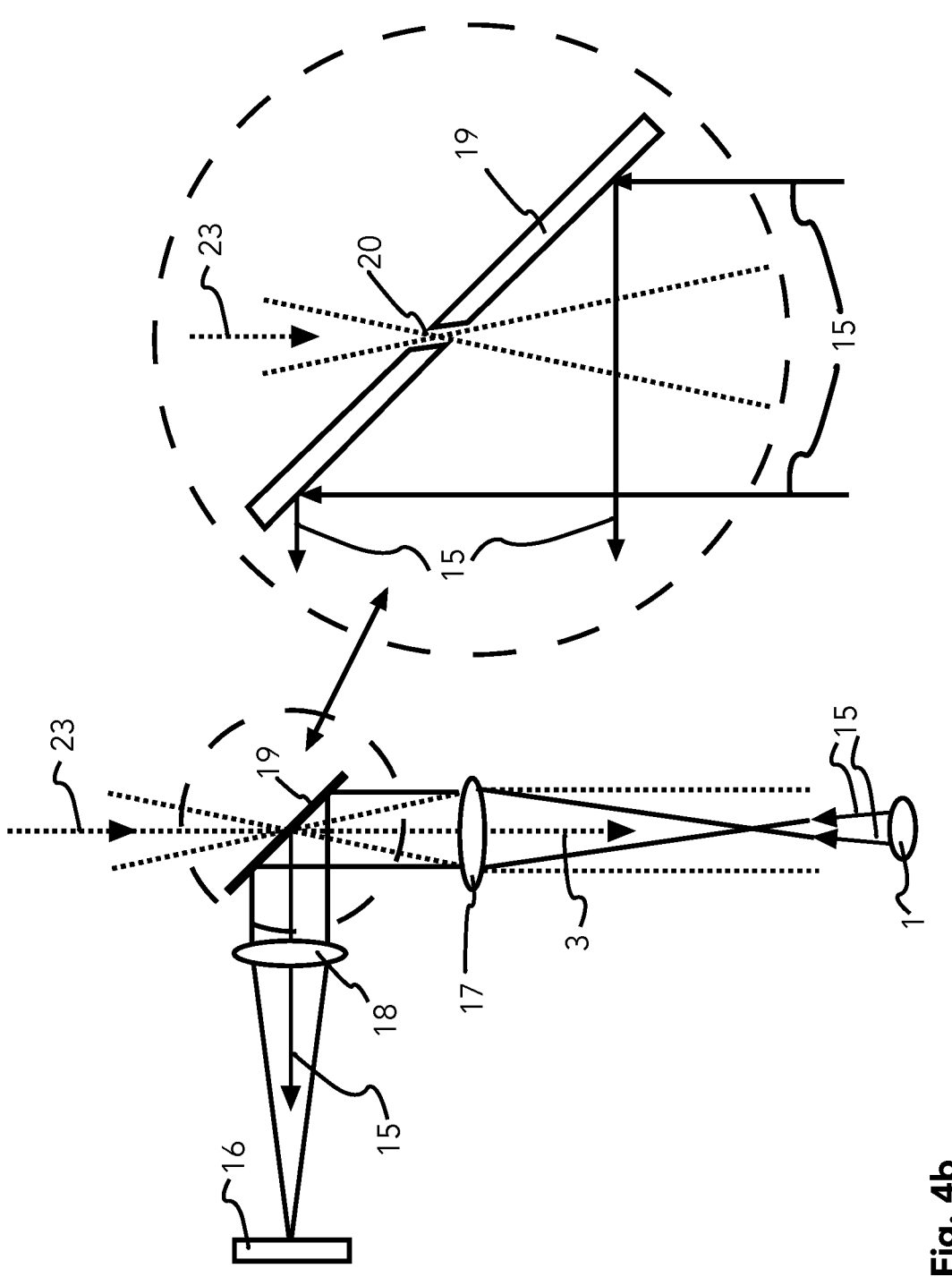
FIG. 4b is a schematic illustration of the separation of the excitation light and the emission light for detection of the emission light.

In both embodiments mentioned above, as shown in FIGS. 4*a* and 4*b*, the resulting image-beam 15, 43, comprising the NA-enhanced emission-pattern 15*a*, 42, is then imaged onto a camera 16, where it forms the desired super-resolution image when disk and hence pattern are rotated. If projection is performed by a pair of telecentric lenses 17, 18, the infinity space between these lenses is best suited for separating the excitation beam 3, 23 from the emission image beam 15, 43. Conventionally, one places a dichroic element between the two lenses 17, 18, but more elegantly one directs the excitation beam 23 through a tiny hole 20 in a plain reflective element 19 before it is collimated by lens 17 to form the collimated excitation beam 3. To minimize the diameter of the tiny hole 20, it is positioned in the backfocal-plane of the first relay-lens 17, where the enhanced NA of emission beam 15 fills an area with 2× the diameter of the corresponding objective pupil (under the assumption of assumes equal focal lengths for relay-lens 17 and the tube lens of the microscope (FIG. 2*b*).

Excitation beam 3, 33 has been called collimated, but its divergence-requirements are significantly relaxed compared to a diffraction-limited collimated beam. As shown, for example, in DE 10 2007 009 551 B3, a system featuring a plurality of microoptical elements to form multiple focussed spots, tolerates a much wider beam-waist for beam 23 within hole 20 than an optical system where all light is focussed into a single spot. In the following example a 100×1.49 objective is used with a focal length of 200 mm for a tube-lens and relay-lens 17. To fill the objective's pupil, microoptical elements 1 with diameter d=500 μm need to have a focal-length of 16.8 mm (NA=0.0149). A diffraction limited spot in the focal plane 5 of the microoptical elements 1 has, at 488 nm, a FWHM diameter of 17.5 μm. If one accepts a geometrical extension of the spot in this plane of 10%, the beam diameter in the tiny through-hole 29 may be as wide as 95 μm. The same relaxed divergence-requirements apply when the optical fiber is not fed by an incoherent light-source, but a multimode laser-source which employs speckle reduction techniques of prior art to generate a homogeneously radiating fiber exit area.

Figure 3:
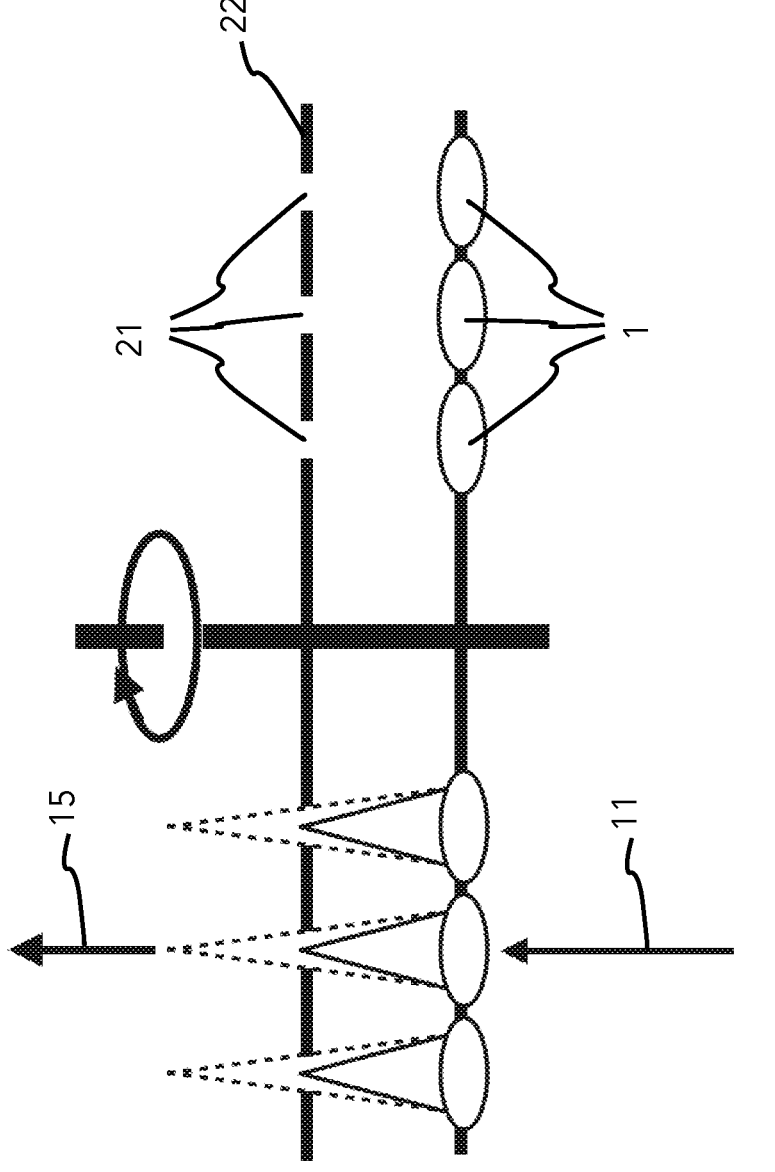
FIG. 3 is a schematic illustration of an extension of the embodiment of FIGS. 2a, 2b to enable out-of-focus rejection.

The optical scheme as shown in FIGS. 2*a* and 2*b* provides super-resolution, but no out-of-focus rejection, yet. As shown in FIG. 3, sectioning is obtained by placing a corresponding pinhole-pattern 21, matching the microoptical elements 1 used for excitation, at a suitable distance behind—as viewed from the microscope—the disk and aligning it with the microoptical elements 1. Given that these pinholes are to provide spatial filtering for the emission, but not for excitation, the pinhole containing layer 22 must be selectively transparent for excitation light and constitute a spatial filter for emission wavelengths, only. This is achieved by etching the pinhole pattern 21 into a suitable dichroic layer 22.

The above description refers to a maximal (two-fold) compression of the emission spots. By tuning the path-length-difference one can adjust the degree of resolution enhancement at will.

The present disclosure is preferably used for fluorescence microscopy with one-photon excitation, or multi-photon excitation (mainly two photon excitations), so that the illumination light is excitation light and the light collected from the sample is fluorescence emission light; in one-photon excitation the emission light is of longer wavelength than the excitation light, and in multi-photon excitation the emission light is of shorter wavelength than the excitation light.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an method or device or a component of an device or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A device for enabling observation of a fluorescent sample with a microscope, the device comprising:

a first disk-shaped body rotatable around a central axis of the first disk-shaped body, the first disk-shaped body including a first plurality of microoptical elements having a first focal-length ($f_{31}$), and being located at a first radial distance ($r_2$), and an at least partially light transmitting area located at a second radial distance ($r_1$), the first radial distance ($r_2$) being different from the second radial distance ($r_1$);

a first tube lens positioned between the first disk-shaped body and an objective of the microscope;

a second tube lens positioned between the first disk-shaped body and the objective of the microscope, wherein a focal length of the first tube lens is $r_2/r_1$ times a focal length of the second tube lens;

a dichroic beam splitter positioned between the first disk-shaped body and the objective of the microscope; and a reflective element positioned between the first disk-shaped body and the objective of the microscope, wherein a collimated excitation beam intersects the first disk-shaped body through the first plurality of microoptical elements at the first radial distance ($r_2$), resulting in a rotating excitation spot-pattern in a focal plane of the first plurality of microoptical elements, which is imaged into infinity by the first tube lens, thus forming an excitation beam, the excitation beam, after being reflected by the reflective element and by the dichroic beam splitter, is transformed into an excitation pattern on the fluorescent sample by the objective of the microscope, and a resulting emission spot-pattern is transformed into an emission beam by the objective of the microscope, is transmitted by the dichroic beam splitter, and is transformed by the second tube lens into an emission spot-pattern passing the at least partially light transmitting area on the first disk-shaped body.

2. The device of claim 1, further comprising:

a second plurality of microoptical elements having a second focal length ($f_{41}$) and being located at the second radial distance ($r_1$) so as to be aligned with the emission spot-pattern.

3. The device of claim 1, wherein the at least partially light transmitting area is configured as a plurality of confocal pinholes that provide spatial filtering of the emission spot-pattern.

4. The device of claim 3, wherein the plurality of confocal pinholes is arranged on a second disk-shaped body.

5. The device of claim 1, wherein the emission spot-pattern is imaged onto a detector through a projective lens system, to form a desired image when the first disk-shaped body is rotated.

6. The device of claim 4, wherein the emission spot-pattern is imaged onto a detector through a projective lens system, to form a desired image when the first disk-shaped body and the second disk-shaped body are rotated.

* * * * *